US006980232B2

(12) United States Patent
Suzuki

(10) Patent No.: US 6,980,232 B2
(45) Date of Patent: Dec. 27, 2005

(54) IMAGE TRANSMITTING INTERNET CAMERA

(75) Inventor: Katsuyoshi Suzuki, Tokyo (JP)

(73) Assignee: PENTAX Corporation, Tokyo (JP)

(*) Notice: Subject to any disclaimer, the term of this patent is extended or adjusted under 35 U.S.C. 154(b) by 647 days.

(21) Appl. No.: 09/785,172

(22) Filed: Feb. 20, 2001

(65) Prior Publication Data

US 2001/0024232 A1 Sep. 27, 2001

(30) Foreign Application Priority Data

Feb. 18, 2000 (JP) ............................ 2000-041764

(51) Int. Cl.[7] ............................................ H04N 5/225

(52) U.S. Cl. ...................... 348/207; 348/211; 709/102; 709/218

(58) Field of Search .......................... 348/207.1, 211.3, 348/207.11, 143, 152, 211, 552, 232, 207; 709/218, 102, 103

(56) References Cited

U.S. PATENT DOCUMENTS

| | | | |
|---|---|---|---|
| 4,531,161 | A | 7/1985 | Murakoshi |
| 4,746,993 | A | 5/1988 | Tada |
| 4,853,733 | A | 8/1989 | Watanabe et al. |
| 5,032,918 | A | 7/1991 | Ota et al. |
| 5,034,804 | A | 7/1991 | Sasaki et al. |
| 5,040,068 | A | 8/1991 | Parulski et al. |
| 5,062,010 | A | 10/1991 | Saito |
| 5,099,262 | A | 3/1992 | Tanaka et al. |
| 5,138,459 | A | 8/1992 | Roberts et al. |
| 5,146,353 | A | 9/1992 | Isoguchi et al. |
| 5,185,667 | A | 2/1993 | Zimmermann |
| 5,231,501 | A | 7/1993 | Sakai |
| 5,283,644 | A | 2/1994 | Maeno |
| 5,283,655 | A | 2/1994 | Usami |
| 5,295,077 | A | 3/1994 | Fukuoka |
| 5,343,243 | A | 8/1994 | Maeda |
| 5,367,332 | A | 11/1994 | Kerns et al. |
| 5,402,170 | A | 3/1995 | Parulski et al. |
| 5,414,464 | A | 5/1995 | Sasaki |
| 5,475,441 | A | 12/1995 | Parulski et al. |
| 5,477,264 | A | 12/1995 | Sarbadhikari et al. |
| 5,479,206 | A | 12/1995 | Ueno et al. |
| 5,486,853 | A | 1/1996 | Baxter et al. |
| 5,488,558 | A | 1/1996 | Ohki |
| 5,506,617 | A | 4/1996 | Parulski et al. |
| 5,528,293 | A | 6/1996 | Watanabe et al. |
| 5,535,011 | A | 7/1996 | Yamagami et al. |
| 5,541,656 | A | 7/1996 | Kare et al. |

(Continued)

FOREIGN PATENT DOCUMENTS

JP 3-268583 11/1991

(Continued)

OTHER PUBLICATIONS

English Language Abstract of JP 8-315106.

(Continued)

*Primary Examiner*—Wendy R. Garber
*Assistant Examiner*—Gary C. Vieaux
(74) *Attorney, Agent, or Firm*—Greenblum & Bernstein, P.L.C.

(57) ABSTRACT

An Internet camera is provided with an image capturing device that captures images and converts the captured images into digital data, a storage device that stores digital data corresponding to the captured images in a form of image data files, a memory that stores schedule data including a plurality of schedule scripts. A schedule merging device is further provided to merge the plurality of schedule scripts into a merged schedule. The image capturing device and a data transfer client are controlled, in accordance with the merged schedule, to capture images and transfer image data files corresponding to the captured images to a predetermined site on the Internet.

28 Claims, 6 Drawing Sheets

U.S. PATENT DOCUMENTS

| | | | |
|---|---|---|---|
| 5,544,315 | A | 8/1996 | Lehfeldt et al. |
| 5,550,586 | A | 8/1996 | Kudo et al. |
| 5,568,192 | A | 10/1996 | Hannah et al. |
| 5,581,299 | A | 12/1996 | Raney et al. |
| 5,587,928 | A | 12/1996 | Jones et al. |
| 5,606,365 | A | 2/1997 | Maurinus et al. |
| 5,612,732 | A | 3/1997 | Yuyama et al. |
| 5,631,701 | A | 5/1997 | Miyake |
| 5,633,678 | A | 5/1997 | Parulski et al. |
| 5,635,983 | A | 6/1997 | Ohmori |
| 5,640,204 | A | 6/1997 | Tsutsui |
| 5,646,684 | A | 7/1997 | Nishizawa et al. |
| 5,724,155 | A | 3/1998 | Saito |
| 5,734,425 | A | 3/1998 | Takizawa et al. |
| 5,754,227 | A | 5/1998 | Fukuoka |
| 5,796,426 | A | 8/1998 | Gullichsen et al. |
| 5,806,005 | A | 9/1998 | Hull et al. |
| 5,815,205 | A | 9/1998 | Hashimoto et al. |
| 5,818,537 | A | 10/1998 | Enokida et al. |
| 5,870,135 | A | 2/1999 | Glatt et al. |
| 5,887,140 | A | 3/1999 | Itsumi et al. |
| 5,911,044 | A | 6/1999 | Lo et al. |
| 5,917,542 | A | 6/1999 | Moghadam |
| 5,990,941 | A | 11/1999 | Jackson et al. |
| 6,005,611 | A | 12/1999 | Gullichsen |
| 6,006,039 | A | 12/1999 | Steinberg et al. |
| 6,034,716 | A | 3/2000 | Whiteing et al. |
| 6,038,296 | A | 3/2000 | Brunson et al. |
| 6,043,837 | A | 3/2000 | Driscoll, Jr. et al. |
| 6,047,264 | A | 4/2000 | Fisher |
| 6,061,502 | A | 5/2000 | Ho et al. |
| 6,065,062 | A | 5/2000 | Periasamy |
| 6,067,571 | A | 5/2000 | Igarashi et al. |
| 6,094,221 | A | 7/2000 | Andersion |
| 6,104,430 | A | 8/2000 | Fukuoka |
| 6,134,606 | A | 10/2000 | Anderson et al. |
| 6,147,598 | A | 11/2000 | Murphy et al. |
| 6,167,469 | A | 12/2000 | Safai et al. |
| 6,188,431 | B1 | 2/2001 | Oie |
| 6,195,511 | B1 | 2/2001 | Harada |
| 6,204,877 | B1 | 3/2001 | Kiyokawa |
| 6,208,426 | B1 | 3/2001 | Saito |
| 6,223,190 | B1 | 4/2001 | Aihara et al. |
| 6,226,449 | B1 | 5/2001 | Inoue et al. |
| 6,256,059 | B1 | 7/2001 | Fichtner |
| 6,278,481 | B1 | 8/2001 | Schmidt |
| 6,300,976 | B1 | 10/2001 | Fukuoka |
| 6,331,869 | B1 | 12/2001 | Furlan et al. |
| 6,353,848 | B1 | 3/2002 | Morris |
| 6,360,362 | B1 | 3/2002 | Fichtner |
| 6,374,406 | B2 | 4/2002 | Hiratai |
| 6,389,464 | B1 | 5/2002 | Krishnamurthy et al. |
| 6,407,752 | B1 | 6/2002 | Harnett |
| 6,438,587 | B2 | 8/2002 | Kitamura |
| 6,441,924 | B1 | 8/2002 | Matsui |
| 6,452,629 | B1 | 9/2002 | Aizawa et al. |
| 6,525,761 | B2 | 2/2003 | Sato et al. |
| 6,539,547 | B2 | 3/2003 | Driscoll, Jr. et al. |
| 6,556,241 | B1 | 4/2003 | Yoshimura et al. |
| 6,567,122 | B1 | 5/2003 | Anderson et al. |
| 6,571,271 | B1 | 5/2003 | Savitzky et al. |
| 6,583,813 | B1 * | 6/2003 | Enright et al. .............. 348/150 |
| 6,591,279 | B1 | 7/2003 | Emens |
| 6,594,032 | B1 | 7/2003 | Hiroki et al. |
| 6,603,502 | B2 | 8/2003 | Martin |
| 6,624,846 | B1 | 9/2003 | Lassiter |
| 6,636,259 | B1 | 10/2003 | Anderson et al. |
| 6,654,060 | B1 * | 11/2003 | Kurosawa et al. ..... 348/333.02 |
| 6,677,989 | B1 | 1/2004 | Aizawa et al. |
| 6,720,987 | B2 | 4/2004 | Koyanagi et al. |
| 6,747,692 | B2 | 6/2004 | Patel et al. |
| 6,751,297 | B2 | 6/2004 | Nelkenbaum |
| 2001/0024232 | A1 | 9/2001 | Suzuki |
| 2002/0053087 | A1 | 5/2002 | Negishi et al. |
| 2003/0025803 | A1 | 2/2003 | Nakamura et al. |
| 2003/0208567 | A1 | 11/2003 | Gross |
| 2004/0012811 | A1 | 1/2004 | Nakayama |

FOREIGN PATENT DOCUMENTS

| | | |
|---|---|---|
| JP | 4-980 | 1/1992 |
| JP | 5-153453 | 6/1993 |
| JP | 5-166090 | 7/1993 |
| JP | 5-167979 | 7/1993 |
| JP | 8-102837 | 4/1996 |
| JP | 8-171691 | 7/1996 |
| JP | 8-315106 | 11/1996 |
| JP | 8-317268 | 11/1996 |
| JP | 9-288684 | 11/1997 |
| JP | 09307794 | 11/1997 |
| JP | 10224676 | 8/1998 |
| JP | 10243153 | 9/1998 |
| JP | 10320685 | 12/1998 |
| JP | 11-27567 | 1/1999 |
| JP | 11-27650 | 1/1999 |
| JP | 11-341338 | 12/1999 |
| JP | 3034243 | 4/2000 |
| WO | 91/07850 | 5/1991 |
| WO | 96/02106 | 1/1996 |
| WO | 99/48276 | 9/1999 |
| WO | 00/07341 | 2/2000 |

OTHER PUBLICATIONS

English Language Abstract of JP 10-224676.

English Language Abstract of JP 10-320685.

A printout (labeled W-1) of a World Wide Web site (Web site) relating to a "Hitachi MPEGCAM", 5 pages, printed Jul. 8, 1997.

A printout (labeled W-2) of a Web site relating to a "Microplex NetWorkEye", 2 pages, printed Aug. 14, 1997.

A printout (labeled W-3) of a Web site relating to a "StarDot WinCam", 3 pages, printed Aug. 5, 1997.

A printout (labeled W-4) of a Web site relating to an "MRT Observer", 1 page, printed Aug. 14, 1997.

A printout (labeled W-6A) of a Web site relating to an "EarthCam Internet Camera", 2 pages, printed Aug. 14, 1997.

A printout (labeled W-6B) of a Web site relating to the "EarthCam Internet Camera", 10 pages, printed Oct. 3, 1997.

A printout (labeled W-7) of a Web site relating to an "Axis NetEye", 1 page, printed Aug. 14, 1997.

Ricoh Digital Electronic Still (Video) Camera, Instruction Manual for Using DC-1, 1995, along with a partial English language translation.

3.3 Connectionless Transport: UDP, Ross and Kurose, http://www-net.cs.umass.edu/kurose/transport/UDP.html, 1996-2000.

English Language Abstract of JP8-171691.

English Language Abstract of JP8-102837.

P.M. Corcoran et al., "Internet Enabled Digital Photography", IEEE, pp. 84-85.

Eng. Trans of NEC Picona digital, Instruction Manual for PC-DC200 and PC-DC200K.

A printout of a News Release from NEC dated Feb. 13, 1997, relating to Picona digital camera.

NEC Picona digital camera, Instruction Manual for PC-DC200 and PC-DC200K.

Printout of a Website relating to Samsung "Webthru" cameras, printed on Aug. 14, 2001.

Samsung Webthru SWC 101/104 User's Guide, printed from Webthru web site on Aug. 14, 2001.
Samsung Webthru SWC160 User's Guide, printed from Webthru web site on Aug. 14, 2001.
A printout of a News Release from Apple dated May 13, 1996, relating to QuickTime image capture system.
"Apple's New Image-Capture Platform", Apple Directions, Aug. 1996, pp. 1, 15, 17-21.
A printout of a Press Release from Apple dated Feb. 17, 1997, relating to QuickTake 200 digital camera.
A printout of Apple Service Source Manual for QuickTake 200 digital camera.
A printout of Press Release from FlashPoint dated Dec. 8, 1997, relating to Digita operating system.
A printout of a Press Release from FlashPoint dated Jun. 15, 1998, relating to Kodak DC 220 and DC 260 cameras with Digita operating system.
"Digita Camera Operating System", the Kleper Report on Digital Publishing, Issue 3.6, Nov./Dec. 1998.
"FlashPoint shows how to process digital photos without a PC", EE Times, posted Apr. 16, 1998.
"Intranet TCP/IP Bible", Chapter 5, "TCP and UDP", pp. 62-99, Nobukazu Iguchi, Ohm Inc., May 30, 1997, together with an English language translation.
"Internet Yearbook '96", vol. 1, Sections 2, 4, pp. 28-33, 208-229, Gijyuto Hyouroun Inc., Apr. 5, 1996, together with an English language translation of the same.
Written Opposition to the Grant of a Patent issued with regard to Japanese Patent No. 3034243, together with an English language translation of the same.
Various "Sharp Zaurus MI-506" materials, including an "Introductory" Instruction Manual pp. 18-19, 22-27, 182-193, 234-235; a "Functional" Instruction Manual, pp. 1-5, 82-83; a "Zaurus Communication" Instruction Manual, pp. 1-7, 74-75, 124-125, 128-129; and a press release dated Jun. 23, 1997, pp. 1/11-11/11, together with an English language translation of each.
Correspondence of Page Numbers Between the Pages in Japanese Documents and the Pages in the English Translations.
Notice of Sending Copies of Written Opinions issued with regard to Japanese Patent No. 3034243, together with an English language translation of the same.
Written Opposition to the Grant of a Patent issued with regard to Japanese Patent No. 3034243, together with an English language translation of the same.
English language translation of a Notice of Reasons for Revocation, issued with regard to Japanese Patent No. 3034243.
A copy of a facsimile press release, PR Newswire file No. p1210083.106, transmitted Dec. 10, 1996, relating to an "Axis NetEye 200".
A printout (labeled W-5) of a Web site relating to a "Carecams RCS5000", 1 page, printed Aug. 14, 1997.
A printout (labeled W-8) of a Web site relating to "Omniview: Electronic Aim and Zoom Camera", printed on Feb. 6, 2001.
A printout (labeled W-9) of a Web site relating to "Interactive Pictures Presents the Whole Picture", printed on Feb. 6, 2001.
A printout (labeled W-10A) of a Web site relating to "Omniview Motionless Camera Orientation System", printed on Feb. 6, 2001.
A printout (labeled W-10B) of a Web site relating to "Stationary Camera Aims and Zooms Electronically", printed on Feb. 6, 2001.
English language Abstract of JP11-27567.
English language Abstract of JP11-27650.
English language Abstract of JP3034243.

* cited by examiner

FIG. 5

| ADDRESS | PARAMETER | | | |
|---|---|---|---|---|
| START-ADDRESS | DAY-FLAG | MON. | FALSE | FIRST SCHEDULE |
| | | TUE. | TRUE | |
| | | WED. | TRUE | |
| | | THU. | TRUE | |
| | | FRI. | TRUE | |
| | | SAT. | FALSE | |
| | | SUN. | FALSE | |
| | START-TIME | | 0:00 | |
| | END-TIME | | 8:00 | |
| | INTERVAL | | 15 MINUTES | |
| | NEXT-POINTER | | ADDRESS 2 | |
| ADDRESS 2 | DAY-FLAGS | MON. | TRUE | SECOND SCHEDULE |
| | | TUE. | TRUE | |
| | | WED. | TRUE | |
| | | THU. | TRUE | |
| | | FRI. | FALSE | |
| | | SAT. | FALSE | |
| | | SUN. | FALSE | |
| | START-TIME | | 21:00 | |
| | END-TIME | | 24:00 | |
| | INTERVAL | | 15 MINUTES | |
| | NEXT-POINTER | | 0 | |

FIG. 6

| ADDRESS | PARAMETER | | | |
|---|---|---|---|---|
| START-ADDRESS | DAY-FLAG | MON. | TRUE | FIRST SCHEDULE |
| | | TUE. | TRUE | |
| | | WED. | TRUE | |
| | | THU. | TRUE | |
| | | FRI. | TRUE | |
| | | SAT. | FALSE | |
| | | SUN. | FALSE | |
| | START-TIME | | 8:00 | |
| | END-TIME | | 17:00 | |
| | INTERVAL | | 10 MINUTES | |
| | NEXT-POINTER | | ADDRESS 2 | |
| ADDRESS 2 | DAY-FLAGS | MON. | TRUE | SECOND SCHEDULE |
| | | TUE. | TRUE | |
| | | WED. | TRUE | |
| | | THU. | TRUE | |
| | | FRI. | TRUE | |
| | | SAT. | TRUE | |
| | | SUN. | TRUE | |
| | START-TIME | | 0:00 | |
| | END-TIME | | 24:00 | |
| | INTERVAL | | 30 MINUTES | |
| | NEXT-POINTER | | 0 | |

IMAGE TRANSMITTING INTERNET CAMERA

BACKGROUND OF THE INVENTION

The present invention relates to an Internet camera which is connected to the Internet and transmits image data files to a predetermined site of a file server on the Internet.

Conventionally, a digital camera has been widely used. The digital camera captures an image, converts the image to digital data, and store the digital data in a form of data files in a storage device such as a hard disk.

Recently, as an application of the digital camera, an Internet camera has been used. An example of the Internet camera is disclosed in U.S. patent application Ser. No. 09/204,289, the teachings of which are incorporated herein by reference.

The conventional Internet camera typically includes a network interface such as a modem for sending the data files via the Internet, and a data transfer client such as an FTP (File Transfer Protocol according to RFC 959) client for controlling the network interface in order to transfer the data files stored in the storage device to a predetermined site of a file server such as an FTP server on the Internet.

In such an Internet camera, images are captured and the image data files are transmitted automatically, in accordance with a predetermined schedule.

Conventionally, however, the schedule includes only one script which defines a start time, an end time and an interval, and the camera operates in a similar manner everyday. The image capturing and/or transferring operations are repeatedly executed at the defined intervals during a period from the start time to the end time.

Since the schedule include only one script, the conventional Internet camera cannot capture the images according to a relatively complicated schedule such as a schedule extending in two days, e.g., a schedule for capturing images from 23:00 of a day to 1:00 of the next day.

SUMMARY OF THE INVENTION

It is therefore an object of present invention for providing an Internet camera for capturing and transferring images according to a relatively complicated schedule as described above.

For the above object, according to the invention, there is provided an Internet camera that captures images of an object and transmitting image data to a predetermined site on the Internet, which camera is provided with an image capturing device that captures images and converts the captured images into digital data, a storage device that stores digital data corresponding to the captured images in a form of image data files, respectively, a memory that stores schedule data which includes a plurality of schedule scripts, a network interface connected to the Internet, a data transfer client that controls the network interface to transfer the image data file to a predetermined site on the Internet, a schedule merging device that merges the plurality of schedule scripts into a merged schedule, and a controller that controls the image capturing device to capture images in accordance with the merged schedule, and controls the data transfer client to transfer the image data file corresponding to the captured image in accordance with the merged schedule to the predetermined site.

With the above configuration, since the image capturing operations and data transferring operations can be performed in accordance with a merged schedule which is generated by combining a plurality of schedule scripts, even if each having a relatively simple data structure, a complicated scheduling can be achieved easily.

Optionally, the schedule merging device may assign priorities to the plurality of schedule scripts, respectively, procedures defined by a schedule script having a higher priority being executed if two or more schedule scripts overlap.

Further optionally, each of the plurality of schedule scripts may include a start time and an end time, between which the images are to be captured and the image data files are to be transferred, and a designation of days of a week, on which the images are to be captured and the image data files are to be transferred.

In this case, each of the plurality of schedule scripts may further include an interval, at every occurrence of which an image is to be captured and an image data file is to be transferred.

According to another aspect of the invention, there is provided an Internet camera that captures images of an object and transmitting image data to a predetermined site on the Internet, which camera is provided with an image capturing device that captures images and converts the captured images into digital data, a storage device that stores digital data corresponding to the captured images in a form of image data files, respectively, a memory that stores schedule data which includes a plurality of schedule scripts, a schedule merging device that merges the plurality of schedule scripts into a merged schedule, and a controller that controls the image capturing device to capture images in accordance with the merged schedule.

With the above configuration, since the image capturing operations can be performed in accordance with a merged schedule, which is generated by combining a plurality of schedule scripts, a complicated scheduling can be achieved easily.

Optionally, the schedule merging device may assign priorities to the plurality of schedule scripts, respectively, procedures defined by a schedule script having a higher priority being executed if two or more schedule scripts overlap.

Further optionally, each of the plurality of schedule scripts may include a start time and an end time, between which the images are to be captured, and a designation of days of a week, on which the images are to be captured.

Still optionally, each of the plurality of schedule scripts may further include an interval, at every occurrence of which an image is to be captured.

According to a further aspect of the invention, there is provided an Internet camera that captures images of an object and transmitting image data to a predetermined site on the Internet, which camera is provided with a memory that stores schedule data which includes a plurality of schedule scripts, a network interface connected to the Internet, a data transfer client that controls the network interface to transfer the image data files as stored to a predetermined site on the Internet, a schedule merging device that merges the plurality of schedule scripts into a merged schedule, and a controller that controls the data transfer client to transfer the stored image data files in accordance with the merged schedule to the predetermined site.

With the above configuration, since the image data transferring operations can be performed in accordance with a merged schedule which is generated by combining a plurality of schedule scripts, a complicated scheduling can be achieved easily.

Optionally, the schedule merging device may assign priorities to the plurality of schedule scripts, respectively, procedures defined by a schedule script having a higher priority being executed if two or more schedule scripts overlap.

Further optionally, each of the plurality of schedule scripts may include a start time and an end time, between which the stored image data files are to be transferred, and a designation of days of a week, on which the stored image data files are to be transferred.

In this case, each of the plurality of schedule scripts may further include an interval, at every occurrence of which the stored image data files are to be transferred.

BRIEF DESCRIPTION OF THE ACCOMPANYING DRAWINGS

FIG. 5 is an example of a schedule data of the embodiment of the present invention; and FIG. 6 is another example of a schedule data of the embodiment of the present invention.

DETAILED DESCRIPTION OF THE EMBODIMENTS

Figure 1:
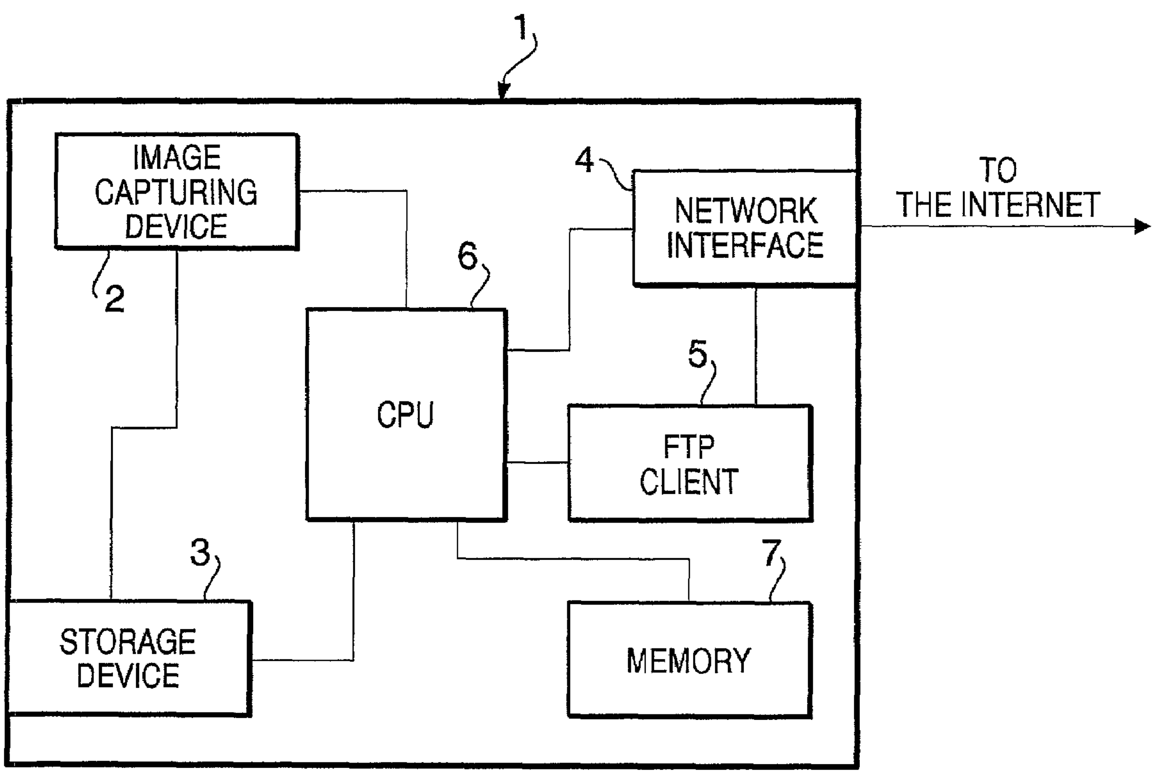
FIG. 1 is a block diagram of an Internet camera according to an embodiment of the present invention.

FIG. 1 is a block diagram of an Internet camera according to an embodiment of the present invention. The Internet camera 1 includes an image capturing device 2, a storage device 3, a controller 6 including a CPU, a memory 7, an FTP client 5, and a network interface 4, such as a modem. It should be noted that the network interface may include a LAN card interface connectable to the Internet through a proxy server.

In the Internet camera 1, the controller 6 controls the image capturing device 2 that captures an image and obtains image data. The image data is stored in the storage device 3 as an image data file. The storage device 3 is capable of storing a plurality of image data files captured at different timings.

The FTP client 5, which is controlled by the controller 6, controls the network interface 4 to transfer the image data files stored in the storage device 3 to a predetermined site of an FTP server (not shown) on the Internet.

In the memory 7, schedule data is stored. Specifically, the schedule data is stored in a form of a data file, which may contain one or more schedule scripts. The controller 6 retrieves the schedule data, and controls the Internet camera 1 to capture images and transfer the image data files in accordance with the schedule script(s) included in the schedule data. It should be noted that, in the embodiment, an image is captured and then an image data file corresponding to the captured image is transmitted to the predetermined site immediately, in accordance with the schedule data. However, the control may be modified such that only one of the image capturing operation or data transmitting operation is executed in accordance with the schedule data, or the image capturing operation and the image data transmitting operation are executed in accordance with different schedules, respectively.

Figures 2A, 2B, 2C:
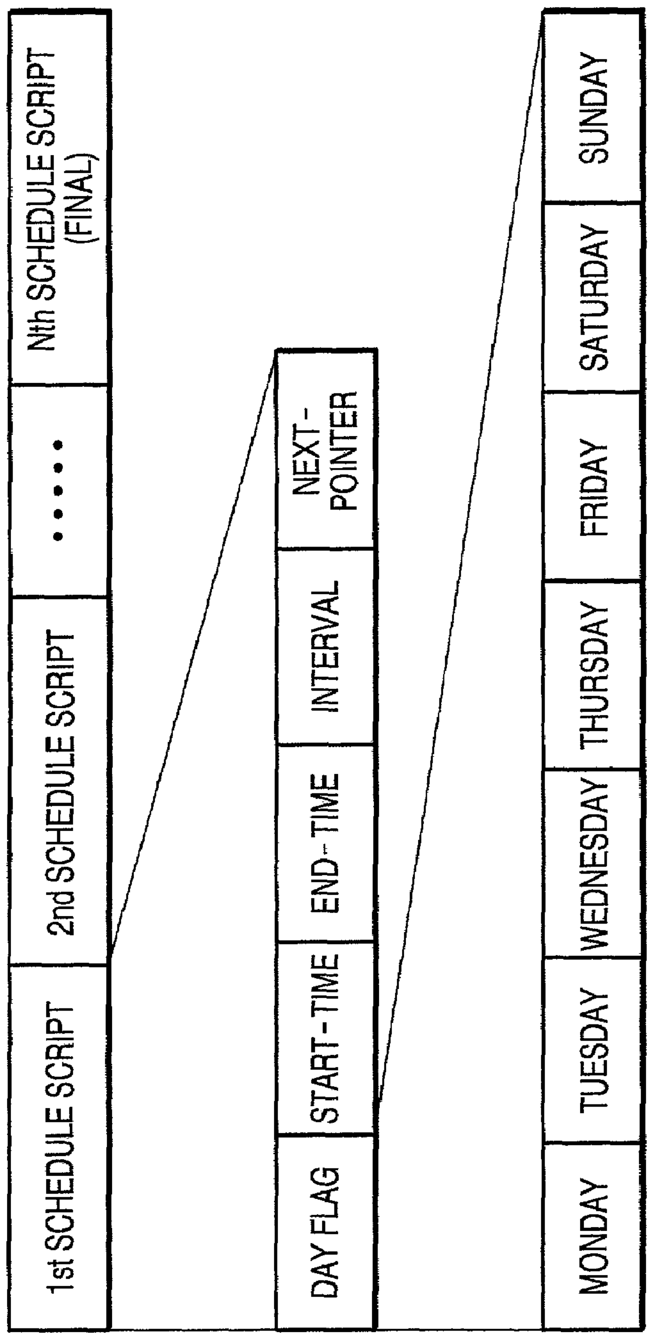
FIGS. 2A–2C show a structure of the schedule data.

FIGS. 2A–2C schematically show an example of the structure of the schedule data. FIG. 2A shows a data structure of the schedule data. The schedule data is stored from a predetermined address (START-ADDRESS) of the memory 7. In the example shown in FIG. 2A, the schedule data includes a plurality of schedule scripts, i.e., a first through N-th schedule scripts. FIG. 2B shows an example of a structure of a schedule script. As shown in FIG. 2B, each schedule script includes a DAY-FLAG parameter, a START-TIME parameter, an END-TIME parameter, an INTERVAL parameter, and a NEXT-POINTER parameter.

FIG. 2C shows a structure of the DAY-FLAG parameter. As shown in FIG. 2C, the DAY-FLAG parameter is a 7-bit parameter. Each of the bits corresponds to each day of a week. That is, from the LSB (Least Significant Bit) of the DAY-FLAG parameter, the bits of the DAY-FLAG parameter represent the TRUE/FALSE states for Monday, Tuesday, Wednesday, Thursday, Friday, Saturday and Sunday, respectively.

If a bit of the DAY-FLAG parameter corresponding to a certain day is "TRUE", at least one capturing operation is executed on the day, between a start time defined by the START-TIME parameter and an end time defined by the END-TIME parameter.

Specifically, the first capturing operation on the day, whose status is "TRUE", is executed at the start time that is defined by the START-TIME.

The INTERVAL parameter indicates an interval. The image capturing and transferring operations are to be executed at the intervals indicated by the INTERVAL parameter, between the start time and the end time. For example, if the START-TIME parameter indicates "11:00", the END-TIME parameter indicates "13:00" and the INTERVAL parameter indicates "30 minutes", images are captured and transferred at 11:00, 11:30, 12:00, 12:30 and 13:00.

The NEXT-POINTER parameter represents a top address in the memory 7 at which the next schedule script is stored if it is included in the schedule data. If no further schedule script is included in the schedule data, the value of the NEXT-POINTER parameter is set to "Null".

Figure 3:
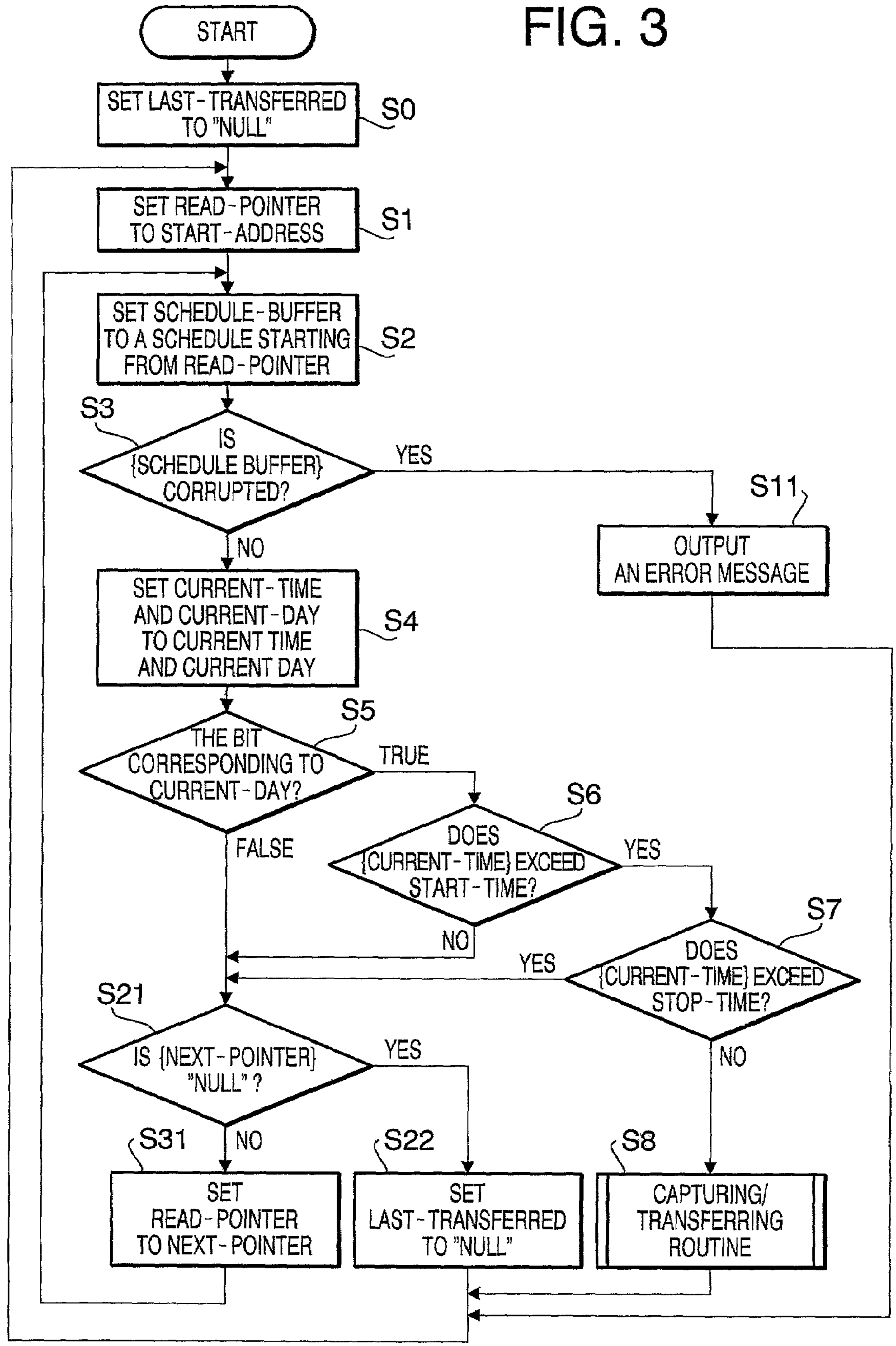
FIG. 3 is a flowchart showing an operation in the embodiment of the present invention.

FIG. 3 shows an image capturing/transferring procedure according to the embodiment of the present invention. The procedure uses a READ-POINTER variable, a CURRENT-TIME variable, a CURRENT-DAY variable, a LAST-TRANSFERRED variable, and a SCHEDULE-BUFFER variable. In the following description, { } represents a data value of the variables. For example, {CURRENT-TIME} represents the time set to the CURRENT-TIME variable.

In S0, the LAST-TRANSFERRED variable is set to "Null", and in S1, the READ-POINTER is set to {START-ADDRESS}, i.e., the value of the START-ADDRESS.

Then, in S2, a schedule script, which starts from an address indicated by the Read-Pointer, is copied to the SCHEDULE-BUFFER. Then in step S3, it is judged whether the schedule script copied in the SCHEDULE-BUFFER is corrupted. If the schedule script in the SCHEDULE-BUFFER is not corrupted (S3: NO), then, in S4, the CURRENT-TIME and CURRENT-DAY variables are set to the current time and current day, respectively. In the embodiment, the current time and current day may be obtained from a time-server on the Internet using a Network Time Protocol. Alternatively, the current time and the current day are obtained from a real-time clock (not shown) of the controller 6. In such a case, the real-time clock may be adjusted based on the time and day obtained from the time-server on the Internet.

In S5, the status of a bit of the DAY-FLAG corresponding to the CURRENT-DAY is set to "TRUE" or "FALSE". If the bit is "TRUE" (S5: TRUE), then, in S6, it is judged whether the {CURRENT-TIME} is after the {START-TIME} of the SCHEDULE-BUFFER. If the {CURRENT-TIME} is after the {START-TIME} (S6: YES), then, in S7, it is judged whether the {CURRENT-TIME} is on or before the {END-TIME} of the Schedule-Buffer.

If the {CURRENT-TIME} does not exceed the {END-TIME} (S7: NO), then, in S8, a procedure for capturing images, storing image data files converted from the captured image, and transferring the image data files is executed at intervals defined by the INTERVAL parameter. Then, control returns to S1, and the image capturing/transferring operation according to another schedule script will be executed.

If the {SCHEDULE-BUFFER} is determined to be corrupted (S3: YES), then, in S11, an error message is output. The error messages may be transferred, as an error message file, to the predetermined site, through the FTP client 5, in order to inform a client remote from the Internet camera 1 of the fact the a schedule script is corrupted. Alternatively or optionally, the error message may be transferred to a user as an e-mail message through a not-shown SMTP client. Then, in order to copy the schedule script again from the memory 7 to the SCHEDULE-BUFFER, control returns to S1 and the setting of the pointer at S1 and the data-loading operation at S2 are executed again.

If the bit corresponding to the CURRENT-DAY is set to "FALSE" in S5, then, in S21, it is judged whether the {NEXT-POINTER} of the SCHEDULE-BUFFER is "NULL". If the {NEXT-POINTER} is "Null" (S21: YES), then, in S22, the LAST-TRANSFERRED variable is cleared, and control returns to S1. If the {NEXT-POINTER} is not "Null" (S21: NO), then, in S31, the READ-POINTER is set to the {NEXT-POINTER}, and control returns to S2, at which another image capturing/transferring operations according to the next schedule script will be executed.

If the {CURRENT-TIME} does not exceed the {START-TIME} (S6: NO), then, in S21, it is judged whether the {NEXT-POINTER} is "Null".

If the {CURRENT-TIME} exceeds the {END-TIME} (S7: YES), then, in S21, it is judged whether the {NEXT-POINTER} of the {SCHEDULE-BUFFER} is "Null".

When the {CURRENT-TIME} is outside the programmed time in the current schedule, controls proceeds from S6 or S7 to S21 to judge whether the {NEXT-POINTER} is "Null". If the {NEXT-POINTER} is not "Null", control returns to S2 vial S31 to operate in accordance with the next schedule. Therefore, when the schedules do not overlap in programmed time for the same day, each schedule is accommodated. This permits at least day-spanning merged schedules. Even if more than two schedule scripts are provided, unless the schedules do not overlap in programmed time for the same day, all the schedules can be accommodated.

Further, when the {CURRENT-TIME} is within the programmed time, control proceeds from S6 to S7, and then S8, and S31 is not executed. In other words, control does not check the next schedule until the {CURRENT-TIME} is outside the programmed time in the current schedule. Therefore, if the schedules overlap in programmed time for the same day, the current schedule overrides or has priority over the next schedule. Accordingly, by appropriately assigning the priorities to the schedule scripts, at least variable-interval schedules can be performed.

Figure 4:
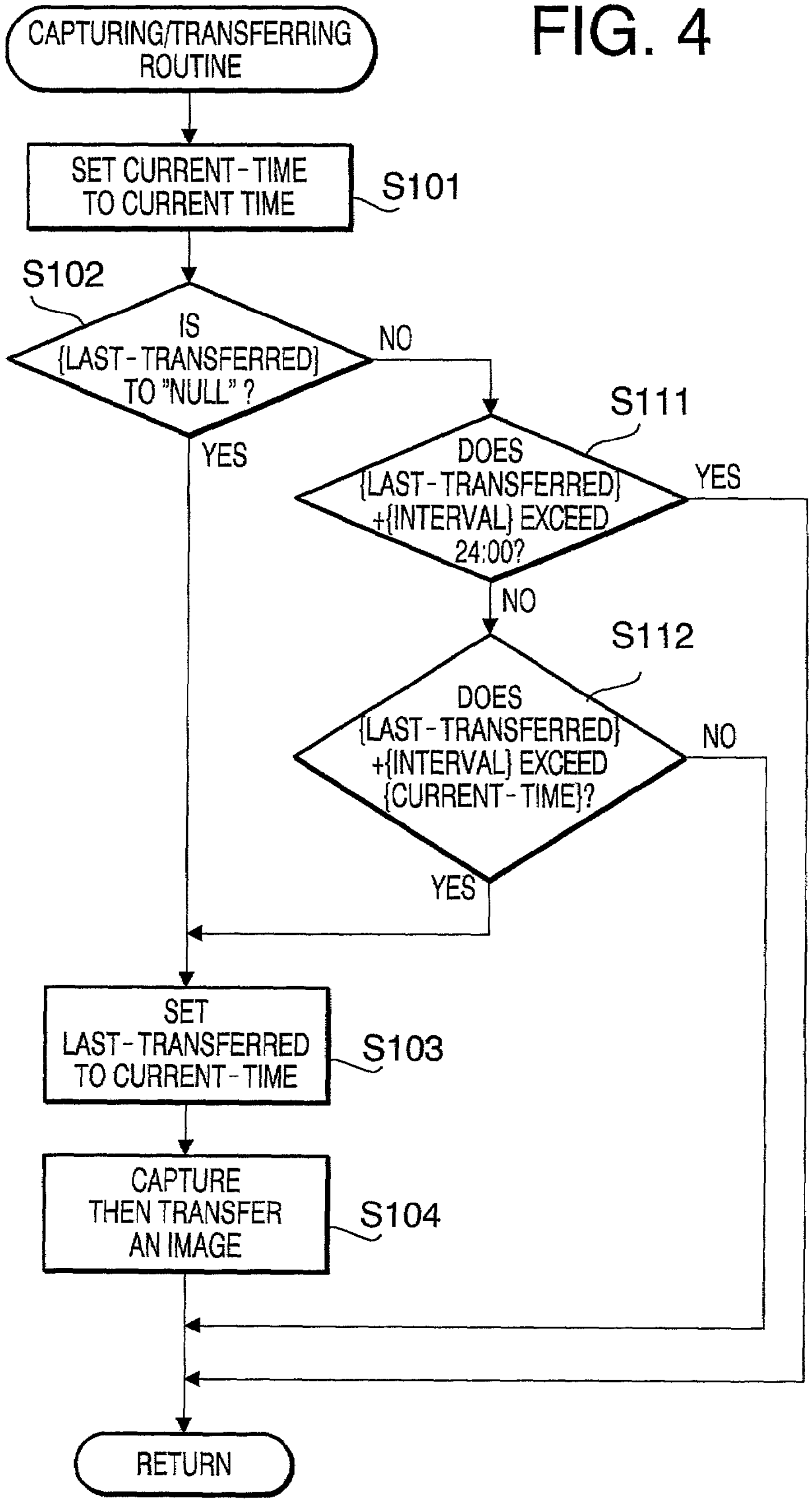
FIG. 4 is a flowchart showing the detailed operation of step S8 of FIG. 3.

FIG. 4 is a flowchart showing the detailed procedure of step S8 of FIG. 3. In S101, the CURRENT-TIME variable is set to the current time. Then in S102, it is judged whether the {LAST-TRANSFERRED} variable is "Null". If the {LAST-TRANSFERRED} is "Null" (S102: YES), then, in S103, the {LAST-TRANSFERRED} variable is set to the {CURRENT-TIME}, i.e., the value (i.e., time) of the CURRENT-TIME variable. Then in S104, the controller 6 controls the image capturing device 2, the storage device 3 and the FTP client 5 to capture an image, convert the captured image into image data, store the image data in the storage device 3 as an image data file, then transfer the image data file to the predetermined site.

If the LAST-TRANSFERRED variable is not "Null" (S102: NO), then, in S111, it is judged whether the value "{LAST-TRANSFERRED}+{INTERVAL}" exceeds 24:00 of the day. If the time does not exceed 24:00 of the day (S111: YES), then, in S112, it is judged whether the time "{LAST-TRANSFERRED}+{INTERVAL}" exceeds the {CURRENT-TIME}. If the time "{LAST-TRANSFERRED}+{INTERVAL}" exceeds the {CURRENT-TIME} (S112: YES), then, in S103, the LAST-TRANSFERRED variable is set to the {CURRENT-TIME}, i.e., the value (i.e., time) of the CURRENT-TIME. Then, in S104, an image is captured, converted into image data, stored in the memory 7 as an image data file, and the image data file is transferred to the predetermined site. It should be noted that, since the LAST-TRANSFERRED variable is set to the {CURRENT-TIME}, steps S103 and S104 are executed once at every interval between the start time and end time.

In step S111, if the time represented by "{LAST-TRANSFERRED}+{INTERVAL}" exceeds 24:00 of the day (S111: YES), then, the procedure shown in FIG. 4 is terminated.

In S112, if the time represented by "{LAST-TRANSFERRED}+{INTERVAL}" exceeds the CURRENT-TIME (S112: YES), then, the procedure shown in FIG. 4 is terminated.

Exemplary Schedule Data

FIG. 5 is an example of the schedule data consisting of first and second schedule scripts. According to the first schedule script, images are captured and transferred at every 15-minute interval, from 0:00 to 8:00, on Tuesday, Wednesday, Thursday and Friday.

According to the second schedule script, the images are captured and transferred at 15-minute intervals, from 21:00 to 24:00, on Monday, Tuesday, Wednesday and Thursday.

In accordance with the procedure shown in FIGS. 3 and 4, the two schedule scripts are merged, and therefore the images are captured and transferred, at 15-minute intervals, from 21:00 of Monday, Tuesday, Wednesday and Thursday to 8:00 of the next day, respectively. Thus, according to the embodiment, a schedule which extends in two days can easily be realized.

FIG. 6 is another example of the schedule data which consists of two schedule scripts. According to the first schedule script, the images are captured and transferred at 10-minute intervals, from 8:00 to 17:00, on Monday, Tuesday, Wednesday, Thursday and Friday.

According to the second schedule script, the images are captured and transferred everyday, at 30-minute intervals, from 0:00 to 24:00.

According to the embodiment, as understood from the flowchart shown in FIG. 3, priorities are assigned to the schedule scripts: the first schedule script has a higher priority than the second schedule script. Therefore, during the time period, which is referred to by both of the first and second schedule scripts, only the first schedule script is valid, and the second schedule script is invalidated.

Therefore, in the second example, the operation according to the second schedule script will not be executed from 8:00 to 17:00 of Monday through Friday. That is, on Monday, Tuesday, Wednesday, Thursday and Friday, the images are captured and transferred at 30-minute intervals from 0:00 to 8:00, at 10-minute intervals from 8:00 to 17:00, and at 30-minute intervals from 17:00 to 24:00, and on Saturday and Sunday, images are captured and transferred at 30-minute intervals, from 0:00 to 24:00.

As above, according to the present invention, by combining a plurality of schedule scripts, each having a relatively simple data structure, a complicated scheduling can be achieved easily.

It should be noted that the present invention is not restricted to the embodiment and examples described above. For instance, the camera 1 may not use the FTP client 5 and a network interface 4 (e.g., a modem), so that the images are merely captured and stored in the storage device 3 as image data files, according to the schedule data. Since the storage device 3 is capable of storing a plurality of image data files, the images captured according to the schedule data are observed by controlling the digital camera manually. Alternatively, the stored image data files may be transferred in accordance with a procedure which is different from the image capturing procedure.

The present disclosure relates to the subject matter contained in Japanese Patent Application No. 2000-041764, filed on Feb. 18, 2000, which is expressly incorporated herein by reference in its entirety.

What is claimed is:

1. An Internet camera that captures images of an object and transmits image data to a predetermined site on the Internet, comprising:
- an image capturing device that captures images and converts the captured images into digital data;
- a storage device that stores digital data corresponding to the captured images in a form of image data files, respectively;
- a memory that stores schedule data which includes a plurality of schedule scripts;
- a network interface connected to the Internet;
- a data transfer client that controls the network interface to transfer the image data file to said predetermined site on the Internet;
- a schedule merging device that merges said plurality of schedule scripts into a merged schedule; and
- a controller that controls said image capturing device to capture images in accordance with the merged schedule, and controls said data transfer client to transfer the image data file corresponding to the captured image in accordance with the merged schedule to said predetermined site.

2. The Internet camera according to claim 1, wherein said schedule merging device assigns priorities to said plurality of schedule scripts, respectively, procedures defined by a schedule script having a higher priority being executed if two or more schedule scripts overlap.

3. The Internet camera according to claim 1, wherein each of said plurality of schedule scripts includes:
- a start time and an end time, between which the images are to be captured and the image data files are to be transferred; and
- a designation of days of a week, on which the images are to be captured and the image data files are to be transferred.

4. The Internet camera according to claim 3, wherein each of said plurality of schedule scripts further includes an interval, at every occurrence of which an image is to be captured and an image data file is to be transferred.

5. The Internet camera according to claim 1, further comprising a hand-operable input device configured to change the schedule data based on manual input.

6. An Internet camera that captures images of an object and transmits image data to a predetermined site on the Internet, comprising:
- an image capturing device that captures images and converts the captured images into digital data;
- a storage device that stores digital data corresponding to the captured images in a form of image data files, respectively;
- a memory that stores schedule data which includes a plurality of schedule scripts;
- a schedule merging device that merges said plurality of schedule scripts into a merged schedule; and
- a controller that controls said image capturing device to capture images in accordance with the merged schedule.

7. The Internet camera according to claim 6, wherein said schedule merging device assigns priorities to said plurality of schedule scripts, respectively, procedures defined by a schedule script having a higher priority being executed if two or more schedule scripts overlap.

8. The Internet camera according to claim 6, wherein each of said plurality of schedule scripts includes:
- a start time and an end time, between which the images are to be captured; and
- a designation of days of a week, on which the images are to be captured.

9. The Internet camera according to claim 8, wherein each of said plurality of schedule scripts further includes an interval, at every occurrence of which an image is to be captured.

10. The Internet camera according to claim 6, further comprising a hand-operable input device configured to change the schedule data based on manual input.

11. An Internet camera that captures images of an object to store image data corresponding to the captured images and transmits the stored image data to a predetermined site on the Internet, comprising:
- a memory that stores schedule data which includes a plurality of schedule scripts;
- a network interface connected to the Internet;
- a data transfer client that controls the network interface to transfer the stored image data to a predetermined site on the Internet;
- a schedule merging device that merges said plurality of schedule scripts into a merged schedule; and
- a controller that controls said data transfer client to transfer the stored image data in accordance with the merged schedule to said predetermined site.

12. The Internet camera according to claim 11, wherein said schedule merging device assigns priorities to said plurality of schedule scripts, respectively, procedures defined by a schedule script having a higher priority being executed if two or more schedule scripts overlap.

13. The Internet camera according to claim 11, wherein each of said plurality of schedule scripts includes:
- a start time and an end time, between which the stored image data is to be transferred; and a designation of days of a week, on which the stored image data is to be transferred.

14. Then Internet camera according to claim 13, wherein each of said plurality of schedule scripts further includes an interval, at every occurrence of which the stored image data is to be transferred.

15. The Internet camera according to claim 11, further comprising a hand-operable input device configured to change the schedule data based on manual input.

16. An Internet camera that captures images of an object and transmits image data to a predetermined site on the Internet, comprising:

a memory that stores schedule data which includes a plurality of schedule scripts;

a network interface connected to the Internet;

a data transfer client that controls the network interface to transfer the image data to a predetermined site on the Internet;

a schedule merging device that merges said plurality of schedule scripts into a merged schedule; and a controller that controls said data transfer client to transfer the image data in accordance with the merged schedule to said predetermined site.

17. The Internet camera according to claim 16, further comprising a hand-operable input device configured to change the schedule data based on manual input.

18. An Internet camera for capturing images and transmitting image data to a site on the Internet, comprising:

an image capturing device configured to capture images and convert the captured images into digital data;

a storage device configured to store digital data corresponding to the respective captured images as image data files;

a memory configured to store schedule data including a plurality of schedule scripts having at least first and second schedule scripts, the first schedule script specifying a first capture time or transfer time extending through a final hour of a first day of the week, and the second schedule script specifying a second capture time or transfer time extending from a start of a first hour of a second day of the week consecutively following the first day of the week;

a network interface connected to the Internet;

a data transfer client configured to control the network interface to transfer the image data file to the site on the Internet;

a schedule merging device configured to merge the plurality of schedule scripts into a merged schedule, the merged schedule specifying at least the first and second capture or transfer times such that the first and second capture or transfer times occur consecutively across a boundary between the first and second days of the week; and a controller configured to control the image capturing device to capture images in accordance with the merged schedule, and configured to control the data transfer client to transfer the image data file corresponding to the captured image in accordance with the merged schedule to the site on the Internet.

19. The Internet camera according to claim 18, further comprising a hand-operable input device configured to change the schedule data based on manual input.

20. An Internet camera for capturing images and transmitting image data to a site on the Internet, comprising:

an image capturing device configured to capture images and convert the captured images into digital data;

a storage device configured to store digital data corresponding to the respective captured images as image data files;

a memory configured to store schedule data including a plurality of schedule scripts having at least first and second schedule scripts, the first schedule script specifying a first interval corresponding to a first period for capture or transfer of image data, the second schedule script specifying a second interval corresponding to a second period for capture or transfer of image data, the second period overlapping the first period along an overlap period, and the first schedule script having a higher priority than the second schedule script;

a network interface connected to the Internet;

a data transfer client configured to control the network interface to transfer the image data file to the site on the Internet;

a schedule merging device configured to merge the plurality of schedule scripts into a merged schedule; and a controller configured to control the image capturing device to capture images in accordance with the merged schedule, and configured to control the data transfer client to transfer the image data file corresponding to the captured image in accordance with the merged schedule to the site on the Internet, wherein either the first and second intervals differ, the first and second periods differ, or the first and second intervals and periods both differ, and wherein the merged schedule specifies the first interval within the overlap period, excluding the second interval from the overlap period.

21. The Internet camera according to claim 20, further comprising a hand-operable input device configured to change the schedule data based on manual input.

22. An Internet camera for capturing images and transmitting image data to a site on the Internet, comprising:

an image capturing device configured to capture images and convert the captured images into digital data;

a storage device configured to store digital data corresponding to the respective captured images as image data files;

a memory configured to store schedule data including a plurality of schedule scripts for capturing images;

a network interface connected to the Internet;

a data transfer client configured to control the network interface to transfer the image data file to the site on the Internet;

a schedule merging device configured to merge the plurality of schedule scripts for capturing images into a merged schedule for capturing images; and a controller configured to control the image capturing device to capture images in accordance with the merged schedule for capturing images.

23. The Internet camera according to claim 22, further comprising a hand-operable input device configured to change the schedule data based on manual input.

24. An Internet camera for capturing images and transmitting image data, comprising:

an image capturing device configured to capture images and convert the captured images into digital data;

a storage device configured to store digital data corresponding to the respective captured images as image data files;

a memory configured to store schedule data including a plurality of schedule scripts;

a schedule merging device configured to merge the plurality of schedule scripts into a merged schedule; and a controller configured to control the image capturing device to capture images in accordance with the merged schedule.

25. The Internet camera according to claim 24, wherein the schedule merging device assigns a respective priority to each of the plurality of schedule scripts.

26. The Internet camera according to claim 24, further comprising a hand-operable input device configured to change the schedule data based on manual input.

27. The Internet camera according to claim 24, wherein each of the plurality of schedule scripts respectively includes:

a start time and an end time, between which the images are to be captured; and a designation of at least one day of the week, on which the images are to be captured.

28. The Internet camera according to claim 27, wherein each of the plurality of schedule scripts further respectively includes an interval, at every occurrence of which an image is to be captured.

* * * * *